United States Patent
Sleiman et al.

(10) Patent No.: US 8,825,955 B2
(45) Date of Patent: Sep. 2, 2014

(54) DATA PROCESSING APPARATUS HAVING A CACHE CONFIGURED TO PERFORM TAG LOOKUP AND DATA ACCESS IN PARALLEL, AND A METHOD OF OPERATING THE DATA PROCESSING APPARATUS

(75) Inventors: Faissal Mohamad Sleiman, Ann Arbor, MI (US); Ronald George Dreslinski, Jr., Sterling Heights, MI (US); Thomas Friedrich Wenisch, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 231 days.

(21) Appl. No.: 13/423,614

(22) Filed: Mar. 19, 2012

(65) Prior Publication Data

US 2013/0132675 A1 May 23, 2013

Related U.S. Application Data

(60) Provisional application No. 61/562,649, filed on Nov. 22, 2011.

(51) Int. Cl.
*G06F 12/08* (2006.01)
(52) U.S. Cl.
USPC ........... 711/118; 711/128; 711/129; 711/130; 711/144
(58) Field of Classification Search
USPC .................. 711/118, 122, 128, 129, 130, 134
See application file for complete search history.

(56) References Cited

U.S. PATENT DOCUMENTS

| | | | | | |
|---|---|---|---|---|---|
| 5,687,337 | A | * | 11/1997 | Carnevale et al. | 712/204 |
| 5,894,487 | A | * | 4/1999 | Levitan | 714/819 |
| 6,189,083 | B1 | * | 2/2001 | Snyder, II | 711/213 |
| 7,290,116 | B1 | * | 10/2007 | Grohoski et al. | 711/216 |
| 7,747,822 | B1 | * | 6/2010 | Favor et al. | 711/125 |
| 2008/0209133 | A1 | * | 8/2008 | Ozer et al. | 711/146 |
| 2009/0031082 | A1 | * | 1/2009 | Ford et al. | 711/128 |

OTHER PUBLICATIONS

C. Kim et al, "An Adaptive, Non-Uniform Cache Structure for Wire-Delay Dominated On-Chip Caches" *ASPLOS X*, Oct. 2002, pp. 211-222.
B.M. Beckmann et al, "Managing Wire Delay in Large Chip-Multiprocessor Caches" Dec. 2004, 12 pages.

(Continued)

*Primary Examiner* — Mardochee Chery
(74) *Attorney, Agent, or Firm* — Nixon & Vanderhye P.C.

(57) ABSTRACT

A data processing apparatus has a cache with a data array and a tag array. The tag array stores address tag portions associated with the data values in the data array. The cache performs a tag lookup, comparing a tag portion of a received address with a set of tag entries in the tag array. The data array includes a partial tag store storing a partial tag value in association with each data entry. In parallel with the tag lookup, a partial tag value of the received address is compared with partial tag values stored in association with a set of data entries in said data array. A data value is read out if a match condition occurs. Exclusivity circuitry ensures that at most one partial tag value of said partial tag values stored in association with said set of data entries can generate said match condition.

19 Claims, 7 Drawing Sheets

(56) References Cited

OTHER PUBLICATIONS

B.M. Beckmann et al, "ASR: Adaptive Selective Replication for CMP Caches" proceedings of the 39th Annual IEEE/ACM Symposium on Microarchitecture (MICRTO0-39), 2006, pp. 1-12.
B.S. Amrutur et al, "Fast Low-Power Decoders for RAMs" IEEE Journal of Solid-State Circuits, vol. 36, No. 10, Oct. 2001, pp. 1506-1515.
B. Calder et al, "Predictive Sequential Associative Caches" $2_{nd}$ International Symposium on High Performance Computer Architecture, Feb. 1996, 10 pages.
J. Chang et al, "Cooperative Caching for Chip Multiprocessors" Jun. 2006, 12 pages.
J. Chen et al, "Low Power Set-Associative Cache with Single-Cycle Partial Tag Comparison" IEEE 2005, pp. 144-147.
S. Bell et al, "TILE64™ Processor: A 64-Core SoC with Mesh Interconnect" 2008 IEEE International Solic-State Circuits Conference, 2008, pp. 88, 89, 598.
M. Ferdman et al, "Temporal Instruction Fetch Streaming" Proceedings of the 41st Annual IEEE/ACM Int'l Symposium on Microarchitecture, 2008, pp. 1-10.
Z. Chishti et al, "Optimizing Replication, Communication, and Capacity Allocation in CMPs" IEEE 2005, 12 pages.
S. Cho et al, "Managing Distributed, Shared L2 Caches through OS-Level Page Allocation" 2006, 11 pages.
H. Dybdahl et al, "An Adaptive Shared/Private NUCA Cache Partitioning Scheme for Chip Multiprocessors" IEEE, 2007, pp. 2-12.
N. Hardavellas et al, "Reactive NUCA: Near-Optimal Block Placement and Replication in Distributed Caches" Proceedings of the 36th Annual International Symposium on Computer Architecture, Jun. 2009, pp. 1-12.
J. Huh et al, "A NUCA Substrate for Flexible CMP Cache Sharing" 19th International Conference on Supercomputing, Jun. 2005, 10 pages.
K. Inoue et al, "Way-Predicting Set-Associative Cache for High Performance and Low Energy Consumption" 3 pages.
Z. Guz et al, "Utilizing Shared Data in Chip Multiprocessors with the Nahalal Architecture" SPAA'08, Jun. 2008, 10 pages.
N. Hardavellas et al, "Database Servers on Chip Multiprocessors: Limitations and Opportunities" 3rd Biennial Conference on Innovative Data Systems Research (CIDR) Jan. 2007, pp. 79-87.
J. Merino et al, "SP-NUCA: A Cost Effective Dynamic Non-Uniform Cache Architecture" ACM SIGARCH Computer Architecture News, vol. 36, No. 2, May 2008, pp. 64-71.
R. Min et al, "Partial Tag Comparison: A New Technology for Power-Efficient Set-Associative Cache Designs" Proceedings of the 17th International Conference on VLSI Design (VLSID'04), 2004, pp. 1-6.
L. Liu, "Cache Designs with Partial Address Matching" ACM MICRO 27, Nov. 1994, pp. 128-136.
N. Muralimanohar et al, "CACTI 6.0: A Tool to Model Large Caches" International Symposium on Microarchitecture, Dec. 2007, pp. 1-24.
N. Muralimanohar et al, "Interconnect Design Considerations for Large NUCA Caches" ISCA'07, Jun. 2007, 12 pages.
S. Thoziyoor et al, "CACTI 5.1" Apr. 2008, pp. 1-74.
D. Weiss et al, "The On-Chip 3-MB Subarray-Based Third-Level Cache on an Itanium Microprocessor" IEEE Journal of Solid-State Circuits, vol. 37, No. 11, Nov. 2002, pp. 1523-1529.
H. Park et al, "A Novel Tag Access Scheme for Low Power L2 Cache" EDAA, 2011, 6 pages.
M.D. Powell et al, "Reducing Set-Associative Cache Energy via Way-Prediction and Selective Direct-Mapping" Proceedings of the 34th International Symposium on Microarchitecture (MICRO), 2001, 12 pages.
S. Yang et al, "Near-Optimal Precharging in High-Performance Nanoscale CMOS Caches" Proceedings of the 36th International Symposium on Microarchitecture (MICRO-36 2003), 2003, 12 pages.
T.F. Wenisch et al, "SimFlex: Statistical Sampling of Computer System Simulation" IEEE MICRO, Jul. 2006, pp. 2-15.
T.F. Wenisch et al, "Temporal Streams in Commercial Server Applications" 2008 IEEE International Symposium on Workload Characterization (IISWC), 2008, pp. 1-10.
R.E. Wunderlich et al, "SMARTS: Accelerating Microarchitecture Simulation via Rigorous Statistical Sampling" 12 pages.
N. Kim et al, "Drowsy Instruction Caches" IEEE, 2002, pp. 219-230.
A. Jaleel et al, "High Performance Cache Replacement Using Re-Reference Interval Prediction (RRIP)" ISCA'10, Jun. 2010, pp. 60-71.
R.E. Kessler et al, "Inexpensive Implementation of Set-Associativity" ACM 1989, pp. 131-139.
H. Kadota et al, "An 8-kbit Content-Addressable and Reentrant Memory" IEEE Journal of Solid-State Circuits, vol. SC-20, No. 5, Oct. 1985, pp. 951-957.
M. Zhang et al, "Highly-Associative Caches for Low-Power Processors" Kool Chips Workshop, 33rd International Symposium on Microarchitecture, Dec. 2000, 6 pages.
C. Zhang et al, "A Way-Halting Cache for Low-Energy High-Performance Systems" ACM Transactions on Architecture and Code Optimization, vol. 2, No. 1, Mar. 2005, pp. 34-54.
M. Zhang et al, "Victim Replication: Maximizing Capacity while Hiding Wire Delay in Tiled Chip Multiprocessors" IEEE, 2005, 10 pages.
T.Y. Yeh et al, "Fast and Fair: Data-stream Quality of Service" CASES'05, Sep. 2005, pp. 237-248.

\* cited by examiner

DATA PROCESSING APPARATUS HAVING A CACHE CONFIGURED TO PERFORM TAG LOOKUP AND DATA ACCESS IN PARALLEL, AND A METHOD OF OPERATING THE DATA PROCESSING APPARATUS

The present application claims the priority of U.S. provisional patent application 61/562,649 filed on Nov. 22, 2011, the entire contents of which are hereby incorporated by reference.

BACKGROUND OF THE INVENTION

1. Field of the Invention

The present invention relates to data processing apparatuses which comprise a cache for storing copies of data values. More particularly, this invention relates to such caches which store tag values corresponding to stored data values and are configured to access the tag values and data values in parallel.

2. Description of the Prior Art

Providing at least one level of cache storage in which copies of data values which are used by a data processing apparatus are stored is a known performance enhancing technique in the field of data processing. Accessing a cache fundamentally comprises two actions—performing a lookup to determine if the desired data value (typically referenced by an address) is currently stored in the cache and accessing that desired data value if it is indeed found to be currently stored in the cache.

Depending on the role of a given cache, the lookup and the data access may be performed sequentially, that is to say a data access is only made once it is established that the desired data value is stored in the cache. Alternatively, in order to reduce the latency of the cache, a number of possible data values (for example a subset selected with reference to only a part of the corresponding address) may be read out whilst the lookup is being performed, and if the lookup confirms that one of those possible data values is the desired data value it is swiftly output. This latter parallel style of access comes at the cost of the extra energy expended in reading out several incorrect data values which are discarded.

An associative cache is configured such that a given data value may be stored in a number of locations in the cache, those locations being determined with reference to part of the address associated with that given data value (and typically referred to as the "index" portion of the address). This number of locations is often provided by subdividing the cache into a number of "ways", wherein each way provides a possible storage location. An associative cache is also commonly configured such that an identifying portion of the address (typically referred to as the "tag" portion of the address) is stored in one of several possible locations identified by the index, whilst the data value itself is stored in a corresponding one of several possible locations identified by the index. Equivalently to the arrangement of the data storage, the number of storage locations for the tag portion is often provided as a number of ways.

As mentioned above, in some caches, for example in latency-sensitive L1 caches, the tag and data access typically proceed in parallel. Under parallel access, all ways of both the tag and data array are read concurrently, and the tag match signal controls an output multiplexer which steers the correct data from the matching data way to the output. Parallel access minimizes latency at the expense of energy efficiency.

By contrast in other caches, such as L2 or last level (LLC) caches, often the associativity is high and the sub-arrays tend to be much larger or more numerous. Hence L2 and LLC cache designs typically instead perform tag and data accesses in series. The tag arrays, which are comparatively narrow relative to the data arrays, are read first and compared to the incoming tag. Thereafter only the single data sub-array containing the desired data is accessed, avoiding the wasted energy of accessing all other ways. Decoupling tag and data accesses also facilitates handling of coherence traffic that must access only the cache tags.

In order to maintain the low energy expenditure of a sequential access procedure, but to improve the access time of a sequential tag-data access cache, it is known to implement "way prediction", wherein a separate structure is used to predict which way of an associative cache will be accessed before the access is initiated. For example, it is known to speculatively set the multiplexer paths at the output of the cache data arrays to select the most-recently-used (MRU) way before the tag comparison is complete. Other approaches have suggested using sources besides the replacement order, such as register or instruction addresses, to index a prediction table to determine which way to access first in sequential associative caches (which access cache ways in consecutive cycles). However, these techniques for way prediction can struggle to provide accurate predictions under some circumstances. For example, whilst MRU techniques (relying on temporal locality) or PC-indexed prediction tables (relying on instruction correlated locality) can be of benefit in L1 caches, such predictive techniques are typically less effective in higher level caches (i.e. in L2 or higher caches), in particular where the cache is shared between multiple processor cores, because temporal locality is filtered by the L1 caches, accesses from multiple cores interleave, and instruction addresses are typically not available, restricting the applicability of these prediction mechanisms.

Another approach to improving the access time of a sequential tag-data access cache is partial tag matching and way filtering. According to this technique, when the cache access address is available, the low-order bits of each stored tag can be compared to an incoming tag ("partial tag matching") to quickly rule out ways that cannot contain the requested cache block. Partial tag matching was first suggested to reduce the number of tags that must be scanned sequentially in early set-associative caches, when tag comparators were expensive. More recently, partial tag matching has been suggested in various forms as a means to reduce the energy requirements of tag comparison in sequential tag-data caches.

In the context of parallel tag-data caches, partial tag matching can be used to implement way filtering by inhibiting access to ways that mismatch. Prior art designs that use partial tag matching in this manner have targeted L1 caches, as parallel access is not typically used in later level caches such as LLCs. A particular challenge in such designs is engineering the partial tag comparison such that it has minimal impact on the data array critical path while saving as much energy as possible.

R. Min, Z. Xu, Y. Hu, and W.-B. Jone in "Partial Tag Comparison: A New Technology for Power-Efficient Set-Associative Cache Designs", In Proceedings of the 17th International Conference on VLSI Design, 2004 propose using a partial tag match to gate sense amplification and bit line multiplexing for those ways which can be ruled out, which allows most of the data array access time for the comparison, but cannot save the energy consumed in driving the word and bit lines. C. Zhang, F. Vahid; J. Yang, and W. Najjar in "A way-halting cache for low-energy high-performance systems", ACM Transactions on Architecture and Code Optimization, 2(1), 2005 propose conserving nearly all of the data array access energy when accessing a relatively small (8 kB) low associativity (4-way) L1 cache by performing the partial tag comparison in parallel with wordline decode, and then gating wordline activation in those ways which can be ruled out.

However, whilst partial tag matching and way filtering can improve the speed of a cache access, known forms of these techniques also have their drawbacks, since they may struggle in some cache contexts. For example, in higher level caches where associativity may be greater, the sub-arrays may be larger, and the locality is reduced (such as in a server-class LLC), implementing these known partial tag matching and way filtering techniques implies the need for a more complex (e.g. wider or MRU-ordered) partial-tag comparison, which can easily compromise the desired energy efficiency and timeliness.

Accordingly it would be desirable to provide an improved cache which is able to operate in a greater range of operational contexts whilst maintaining the energy efficiency of known way filtering and way prediction techniques, without significantly affecting the latency.

SUMMARY OF THE INVENTION

Viewed from a first aspect, the present invention provides a data processing apparatus comprising:

a processor core configured to perform data processing operations;

a cache having a data array and a corresponding tag array, said data array configured to store data values for access by said processor core and said tag array configured to store tag portions of addresses associated with said data values in tag entries of said tag array, said cache configured to perform a tag lookup procedure in response to a received address, said tag lookup procedure comprising comparing a tag portion of said received address with an identified set of tag entries in said tag array to determine if a data value associated with said received address is stored in said cache, said identified set of tag entries being determined by an index portion of said received address, wherein said data array comprises a partial tag store configured to store a partial tag value in association with each entry in said data array, said partial tag value comprising a strict subset of the tag portion stored in a corresponding entry of the tag array, wherein said data array is configured to perform a data access procedure in parallel with said tag lookup procedure, said data access procedure comprising comparing a partial tag value of said received address with partial tag values stored in association with a set of data entries in said data array corresponding to said identified set of tag entries in said tag array, wherein said data array is configured to read out a selected data value from an entry in said set of data entries in said data array if a match condition occurs, said match condition comprising said partial tag value of said received address matching a partial tag value stored in association with that entry, wherein said cache comprises exclusivity circuitry configured to ensure that at most one partial tag value of said partial tag values stored in association with said set of data entries can generate said match condition.

The cache is configured to have a data array and a tag array, the tag array being used to store tag portions of addresses associated with the data values which are stored in the data array. There is a correspondence between the tag array and the data array, such that when a data value is stored in the cache, the data value itself is stored in the data array a tag portion of its address is stored in a corresponding entry of the tag array. To determine if a given data value is stored in the cache, the cache is configured to perform a tag lookup procedure which compares a tag portion of the address received by the cache (and by which the data value is referenced) with tag portions previously stored in the tag array to determine if that data value is stored in the cache. The tag lookup procedure does not compare the tag portion of the received address with all stored tag portions in tag array but rather with an identified set of tag entries in the tag array, this identified set being determined by an index portion of the received address. In other words, an index portion of the received address determines the set of tag portions in the tag array to be compared against and the tag portion of the received address provides the value which is compared against that identified set.

The data array of the cache is configured to perform a data access procedure in parallel with the tag. The data array itself comprises a partial tag store which is configured to store a partial tag value in association with each entry in the data array. These partial tag values are each a strict subset of the tag portion stored in a corresponding entry of the tag array. It will be understood that a strict subset implies that the partial tag value comprises fewer bits than the tag portion. In the data access procedure which is performed in parallel with the tag lookup procedure, the data array is configured to compare a partial tag value taken from the received address with a set of partial tag values stored in the partial tag store. In particular, this set of partial tag values is identified by the index portion of the received address, such that the set of partial tag values against which the partial tag value of the received address is compared corresponds to a set of data entries in the data array corresponding to the identified set of tag entries in the tag array (against which the tag portion of the received address is being compared in parallel).

The data array is configured to only read out a selected data value from one of the corresponding data entries and the data array if a match condition occurs. This match condition requires that the partial tag value of the received address matches a partial tag value stored in association with that entry. Accordingly, a variety of way filtering is performed wherein a data value will only be read out of the data array if its associated partial tag value indicates a match to the partial tag value of the received address. However, in addition the cache comprises exclusivity circuitry which is configured to ensure that at most one partial tag value identified by the index portion of the received address can generate the match condition. Accordingly, at most one data value will be read out from the data array. It should be understood that reading a data value out from the data array does not necessary mean that this data value will be output by the cache, since this will further require that the tag lookup procedure which has been carried out in parallel indicates that the "full" tag portion of the received address has matched with the corresponding tag portion stored in the tag array. In other words, the exclusivity circuitry is not arranged at the output of the cache merely to ensure that only one data value is output by the cache in response to the single received address, but operates at the level of the data array itself to ensure that at most one data value is read out from the identified set of data entries of the data array. Hence, the energy expended in reading out data values from the data array is limited to that associated with reading out a single data value (as would be the case in a sequentially accessed cache).

The exclusivity circuitry could take a number of forms, but in one embodiment said exclusivity circuitry comprises an additional bit stored in association with each said partial tag value associated with each entry in said data array, wherein said data array is configured such that said match condition further requires said additional bit to have a predetermined value and said cache is configured to administer values of said additional bits such that at most one additional bit stored in association with each said partial tag value stored in association with said set of data entries can have said predetermined value.

Providing the exclusivity circuitry in the form of an additional bit stored in association with each partial tag value means that the match condition may be efficiently determined by treating the additional bit as a further bit of the partial tag value and making use of the mechanisms in place for comparing partial tag values. Hence, when determining if there is a partial tag match, it can be additionally checked if this additional bit has the required predetermined value. For example, the additional bit could be viewed as an "inhibit bit" which is set to "1" to prevent the match condition from being found. The cache is then configured to administer the values of these additional bits such that only one additional bit associated with the set of data entries which have the same partial tag value can have the required predetermined value for the match condition. For example in the case of inhibit bits, the cache is configured to ensure that only one inhibit bit is allowed to be set to "0". Of course the additional bit could equally well be configured as an "enable bit", in which case only one additional bit associated with the set of data entries would be allowed to be set to "1".

In one embodiment each said additional bit stored in association with each said partial tag value associated with each entry in said data array is also stored as a duplicate bit in said tag array in association with each said tag portion corresponding to each said entry in said data array.

Accordingly, a duplicate copy of each additional bit stored in association with each partial tag value in the data array's partial tag store is also stored as a duplicate bit in the tag array in association with each tag portion stored therein. Storing this duplicate bit in the tag array has the advantage that it may be checked as part of the tag lookup procedure and accordingly the result of the tag lookup procedure may be further informed by what value the additional bit stored in association with the relevant partial tag value in the data array has.

For example, in one such embodiment said cache is configured to control said data array to output said selected data value if said duplicate bit corresponding to said selected data value has said predetermined value. Accordingly if the duplicate bit has the predetermined value, the tag lookup procedure can cause the data, value to be output from the cache. That is to say, not only will the fact that the relevant additional bit stored in the data array has the predetermined value mean that the data value will be read out from the data array, but the fact that the duplicate bit has the predetermined value can be used as an efficient mechanism for causing the read out data value to be output from the cache.

In one embodiment said cache is configured to control said data array to subsequently read out said data value from a different entry in said set of data entries in said data array by requiring that the additional bit stored in association with that different entry does not have said predetermined value if said tag lookup procedure indicates that said data value associated with said received address is stored in said different entry, and to cause said additional bit stored in association with said different entry to be updated to have said predetermined value and to cause said additional bit stored in association with said selected data value to be updated not to have said predetermined value.

Of course, due to the fact that only a partial tag comparison is being performed in the data arrays, it may be the case that the data access procedure does not read out the desired data value. In this situation, the cache is configured to control the data array to perform the required read out, taking the data value from a different entry in said set of data entries. Given that this further read out procedure has been required because the additional bits stored in association with the different entry did not have said predetermined value, the data access procedure for this subsequent readout can explicitly require that the additional bit stored in association with that different entry does not have the predetermined value, providing an efficient mechanism for carrying out this further read out. Thereafter the additional bits can be updated to cause the additional bit stored in association with the different entry to have the predetermined value and to cause the additional bit stored in association with the selected data value to not have the predetermined value.

In one embodiment said cache is configured, if said tag lookup procedure indicates that said data value associated with said received address is stored in said selected entry but said additional bit stored in association with said selected entry did not have said predetermined value, to control said data array to subsequently read out said data value from said selected entry by requiring that said additional bit stored in association with that selected entry does not have said predetermined value and to update said additional bit to have said predetermined value.

The situation may arise where the desired data value is indeed stored in the data array, but was not read out because its additional bit did not have the required predetermined value. In this situation the cache may be configured to control the data array to perform another data access procedure in order to read out the desired data value. This may be efficiently performed by explicitly requiring the additional bit to not have the predetermined value and the cache is configured thereafter to update the additional bit to have the predetermined value.

In one embodiment said cache is configured, when storing a new data value in a newly selected entry in said data array for access by said processor core, to cause said additional bit stored in association with said newly selected entry to have said predetermined value.

In the above mentioned example in which a subsequent readout procedure was required, the additional bit associated with the data value which was read out and output in the subsequent data access procedure is updated to have the predetermined value, meaning that the next time this data value is accessed, the first data access procedure will successfully read it out. In other words, this updating of the additional bit implements a most-recently-used (MRU) policy. Equally, when a new data value is stored in a new entry in the data array the cache can be configured to cause the additional bit stored in association with that new entry to have the predetermined value as part of such a MRU policy.

In one embodiment said cache is configured, when storing said new data value, to identify a new set of data entries in said data array determined by an index portion of a newly received address associated with said new data value, and to cause said additional bit stored in association with each of said new set of data entries other than said newly selected entry not to have said predetermined value.

Accordingly, when a new data value is stored in the data array of the cache, the index portion of the newly received address can be used to identify the set of data entries which will be identified by the index portion of the address corresponding to that new data value (i.e. have a matching partial tag value) and the additional bits stored in association with each of those other data entries can be configured not to have said predetermined value, such that only the new data value has the predetermined value.

In one embodiment said cache is configured to cause said duplicate bit to be identically updated when an update to said additional bit is made.

Causing the duplicate bits stored in the tag array to be identically updated when an update to the additional bits stored in the data array is made ensures that the set of additional bits stored in each location is always the same and the duplicate bits stored in the tag array can be reliably used to control operation of the data array.

In one embodiment said cache is an n-way associative cache, and wherein said data array comprises n data ways and said tag array comprises n tag, ways corresponding to said n data ways.

An n-way associative cache represents a type of cache where the present techniques are particularly applicable, since the associativity of the cache means that a given data value can be stored in n different locations in the data ways. The present techniques are of particular benefit in a highly associative cache (i.e. n is large) since a partial tag matching approach may be implemented without risking a large number of data ways offering potential candidate data values to be read out.

In one embodiment said identified set of tag entries comprises a tag entry from each of said n tag ways and said set of data entries comprises a data entry from each of said n data ways. Accordingly, the index portion of the received address identifies a set of tag entries spanning the n tag ways and the index portion identifies a corresponding set of data entries spanning the n data ways.

In one embodiment said n-way associative cache is a highly associative cache, wherein n>4. The present techniques are particularly beneficial in the context of a highly associative cache (where highly associative is understood here to mean that the cache has more than four ways) because the partial tag matching performed enables a parallel lookup in the large number of ways to be performed, whilst the exclusivity circuitry ensures that the energy expenditure in this parallel process is kept down to that corresponding to a sequential access.

In one embodiment said partial tag value comprises p bits and wherein $2^p \geq 4n$.

The number of bits which the partial tag value comprises represents a critical parameter for the efficient operation of the cache, in particular in the context of a highly associative cache. If too few bits are used for the partial tag value then mispredictions may commonly result from the partial tag comparison procedure. However studies of the present techniques have shown that for an n-way associative cache, the benefits performing the partial tag comparison are generally realised when this relationship between p and n is satisfied.

In one embodiment said exclusivity circuitry is configured to be controlled by said processor core to determine which one partial tag value of said partial tag values can generate said match condition.

Accordingly, whilst the exclusivity circuitry could for example be configured as described above to independently implement a MRU policy, this exclusivity circuitry may be controlled by the processor core to determine which single partial tag value in the identified set can generate the match condition. This provides the processor core with a high level of control over the prediction mechanism in the data arrays, which may for example be used to preferentially predict data values belonging to particular processing threads, to treat pre-fetched or demand allocated data values differently or to enable the prediction for only part of the address space.

In one embodiment said partial tag store comprises a content addressable memory. A content addressable memory implementation of the partial tag store can be advantageous because of the tight timing constraints that may be imposed when performing a lookup in this partial tag store, which must complete this operation faster than the word line decoders of the data array to avoid delaying the data array critical path. This is particularly the case in the context of a large cache which requires proportionately larger partial tag values to be compared.

In one embodiment said data processing apparatus comprises multiple processor cores which share access to said cache.

The access by multiple processor cores to the same cache means that traditional techniques of way prediction, for example based on temporal locality are less effective and the present techniques benefit such a context.

In one embodiment said cache is not a first level cache with respect to said processor core.

In a cache which is not a first level cache with respect to the processor core prior art predictive techniques for identifying the desired data value are of less benefit because the temporal locality of the accesses to data values is filtered by the lower level caches and because in general higher level caches have greater associativity.

In one embodiment said data processing apparatus is embodied as a system-on-chip and said cache is a last-level cache on said system-on-chip.

The latency of a last-level cache can be particularly important in certain contexts. For example, when the system-on-chip is implementing a server application, such server applications may be particularly sensitive to the last level cache latency, because their large instruction footprints can overwhelm primary instruction caches, but fit comfortably within the last level cache, exposing the last level cache latency on the fetch critical path. Accordingly, the present techniques are of particular benefit in such a context due to their ability to allow parallel way accesses to be performed in large highly associative caches without significant increased energy expenditure.

Viewed from a second aspect, the present invention provides a method of operating a data processing apparatus comprising the steps of:

performing data processing operations in a processor core;

storing data values for access by said processor core in a data array of a cache and storing tag portions of addresses associated with said data values in tag entries of a tag array of said cache;

performing a tag lookup procedure in said cache in response to a received address, said tag lookup procedure comprising comparing a tag portion of said received address with an identified set of tag entries in said tag array to determine if a data value associated with said received address is stored in said cache, said identified set of tag entries being determined by an index portion of said received address;

storing in a partial tag store a partial tag value in association with each entry in said data array, said partial tag value comprising a strict subset of the tag portion stored in a corresponding entry of the tag array;

performing a data access procedure in said data array in parallel with said tag lookup procedure, said data access procedure comprising comparing a partial tag value of said received address with partial tag values stored in association with a set of data entries in said data array corresponding to said identified set of tag entries in said tag array; and reading out a selected data value from an entry in said set of data entries in said data array if a match condition occurs, said match condition comprising said partial tag value of said received address matching a partial tag value stored in association with that entry, wherein said cache comprises exclusivity circuitry configured to ensure that at most one partial tag value of said partial tag values stored in association with said set of data entries can generate said match condition.

Viewed from a third aspect, the present invention provides a data processing apparatus comprising:

processor means for performing data processing operations;

cache means having data array means and corresponding tag array means, said data array means for storing data values for access by said processor core and said tag array means for storing tag portions of addresses associated with said data values in tag entries of said tag array, said cache means for performing a tag lookup procedure in response to a received address, said tag lookup procedure comprising comparing a tag portion of said received address with an identified set of tag entries in said tag array means to determine if a data value associated with said received address is stored in said cache means, said identified set of tag entries being determined by an index portion of said received address, wherein said data array means comprises partial tag storage means for storing a partial tag value in association with each entry in said data array means, said partial tag value comprising a strict subset of the tag portion stored in a corresponding entry of the tag array means, said data array means for performing a data access procedure in parallel with said tag lookup procedure, said data access procedure comprising comparing a partial tag value of said received address with partial tag values stored in association with a set of data entries in said data array means corresponding to said identified set of tag entries in said tag array means, said data array means for reading out a selected data value from an entry in said set of data entries in said data array means and if a match condition, occurs, said match condition comprising said partial tag value of said received address matching a partial tag value stored in association with that entry, wherein said cache means comprises exclusivity means for ensuring that at most one partial tag value of said partial tag values stored in association with said set of data entries can generate said match condition.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
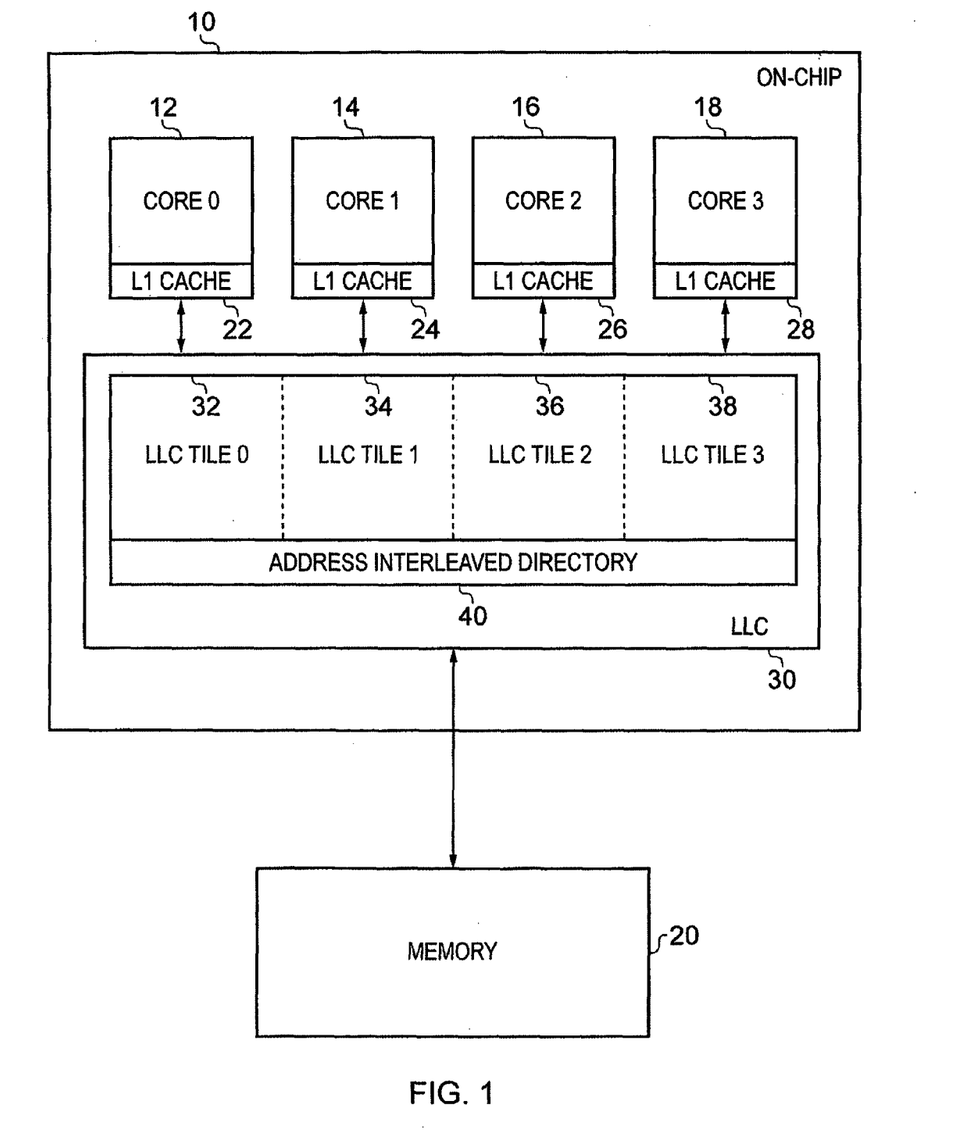
FIG. 1 schematically illustrates a system-on-chip comprising four processor cores which share a last-level cache in one embodiment.

FIG. 1 schematically illustrates a system-on-chip 10, which comprises four processor cores 12, 14, 16, 18. Each processor core has its own L1 cache 22, 24, 26, 28 respectively. These caches are provided to give the processor cores rapid access to data values originally retrieved from memory 20, such that those data values do not need to be retrieved from memory 20 every time a given processor core wishes to use them. Here it should be understood that the term "data value" may be a data value in the strict sense of the word i.e. a value on which the processor core performs an operation, or may also refer to an instruction. The system-on-chip 10 further comprises a last-level cache (LLC) 30 which is shared between all four processor cores. In this embodiment, the system-on-chip 10 is configured to support server applications and the LLC 30 is a large, highly associative cache configured to cope with the multi-megabyte instruction footprints which the server applications executing on the four processor cores have. The large size of these instruction foot prints means that the L1 caches 22, 24, 26 and 28 are typically overwhelmed, but the LLC 30 can accommodate these large instruction sets. In the illustrated example, the LLC 30 is subdivided into four tiles 32, 34, 36, 38 each of which comprises a 2 MB 16-way associative cache with 64-byte blocks that is subdivided into eight independently operating banks. Scheduling and control structures (e.g. miss status handling registers) are shared across all banks. Within a bank, tag and data pipelines are separately scheduled (to facilitate coherence traffic that often requires access only to the tags) and hence do not share decoders. Accordingly, when a given processor core issues an access request specifying the address of the data value it requires, it own L1 cache is first consulted, whereafter when an L1 miss occurs the LLC tile local to the core is first accessed before the address interleaved directory 40 is consulted to locate any other on-chip copies before proceeding off chip to memory 20.

Figure 2:
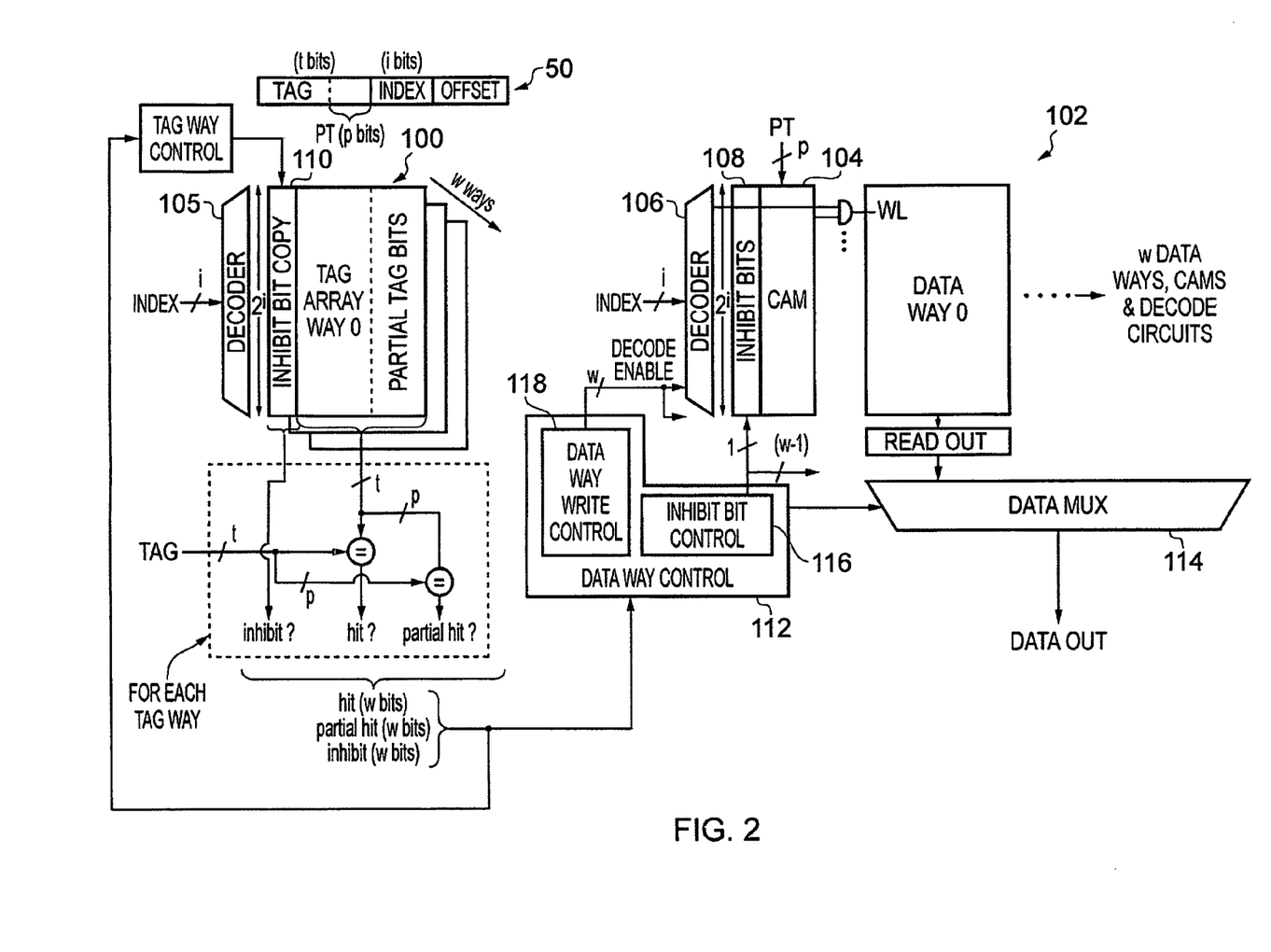
FIG. 2 schematically illustrates the configuration and control flow in a cache in one embodiment.

FIG. 2 schematically illustrates the configuration and control flows within one of the LLC tiles shown in FIG. 1. The cache tile fundamentally comprises a tag array 100 and a data array 102. The cache is configured in a set associative fashion and accordingly the tag array 100 is subdivided into w ways, whilst the data array 102 is correspondingly divided into w data ways. Each LLC tile illustrated in FIG. 1 is additionally subdivided into eight banks, although for clarity of illustration only one bank is illustrated in FIG. 2. Item 50 in FIG. 2 schematically illustrates an address in the address space used to reference the data values which may be stored in the cache. In this example embodiment a 38-bit physical address space is used and an address is considered to comprise 21 tag bits, 8 set selection (index) bits, 3 bank selection bits and 6 block offset bits. Note that because FIG. 2 only schematically illustrates one bank, the bank bits of address 50 are omitted for consistency of the illustration.

Importantly in the present context, the tag bits of the address comprise partial tag bits which represent a strict subset of the "full" tag. Accordingly, where the tag comprises t bits, the partial tag is represented by p of those t bits. In the illustrated example embodiment where 21 tag bits are used, the seven least significant of these are taken as the partial tag bits. When a data value is stored in the cache and the data value itself is stored in an entry of one of the data ways in the data array 102, the tag portion of the corresponding address is stored in a corresponding entry of the corresponding way within the tag array 100. The entry used to store a given data value in the data array 102 and to store its corresponding tag portion in the tag array 100 is identified by the index bits of the address which in the illustrated example embodiment are given by eight bits of the address. The index value is decoded by decoders 105 and 106 for the tag array and data array respectively, these decoders being "i to 2i" decoders. Accordingly the 8 bits of the index value are decoded to identify one of 256 entries in the arrays. In addition to the tag portion being stored an entry in the tag array 100, the partial tag bits of that tag portion of the address are also stored in the partial tag store provided by the content-addressable memory (CAM) 104 in the data array 102. The CAM 104 is associated with a given data way in the data array 102.

Data values stored in the cache are accessed as follows. When an address 50 is received by the cache, the tag portion is passed to the tag array, whilst the partial tag bits (PT) of the tag portion are passed to the data array 102. Also, the index part of the address is passed to both the tag array 100 and the data array 102. The index value (decoded by the respective decoder) identifies a "set" of entries in both the tag array 100 and the data array 102, this set comprising an entry from each of the w ways of each respective array. Within the tag array 100, the set of entries identified by the index are read out and the respective contents are compared against the received tag portion of the address. If one of the read out values matches, this "hit" indicates that the desired data value is currently stored in the cache and should be read out and output from the data array side of the cache.

In parallel to the tag lookup procedure being performed, the data array 102 performs a data access procedure in which the partial tag bits (PT) of the address are passed to the CAM 104 associated with each data way in the data array. As mentioned above, the index value is decoded in decoder 106 to identify an entry in each data way and a corresponding entry in each CAM associated with each data way. As illustrated in FIG. 2, the word lines (WL) of each data way are coupled to both the output of the data array decoder 106 and the corresponding entry of the CAM 104. Accordingly, for a given word line to be activated, it requires not only the corresponding index value to be received, but also the content of the corresponding entry CAM 104 to match with the received partial tag bits.

Given that the partial tag bits are, by definition, a strict subset of the tag portion of the address 50, it will be appreciated that it is possible for a match to be found between a given CAM entry and the received partial tag bits when the full tag portion does not in fact match. Accordingly, not only is a match between the received partial tag bits and the CAM entry not a definitive identification of the desired data value, but also it is possible for matches to be found between the received partial tag bits and the partial tags bits stored in more than one of the set of CAM entries identified by the index value. In the latter example, reading out the data ways whose CAM entries have matched with the partial tag bits would expend unnecessary energy, because it is possible for the partial tag bits to match in several data ways and therefore for several data values to be read out. To address this issue, the cache illustrated in FIG. 2 implements a system of "inhibit bits" 108 which are stored in association with the partial tag bits stored in the CAM 104 of each data way. Indeed, in the embodiment illustrated, the inhibit bits 108 in fact simply form an additional bit appended to the partial tag bits, i.e. the bit length of the value stored in each entry of the CAM 104 is simply increased by one. The purpose of the inhibit bits 108 is to provide a kind of "exclusivity circuitry", which is configured to ensure that for a given received index value and set of partial tag bits, only one data way can generate the required match and read out its data value. This exclusivity function is performed by requiring that in addition to the partial tag bits matching with the corresponding stored partial tag bits in an entry of a CAM 104, the associated inhibit bit must also be "0". The cache is configured to administer the inhibit bits such that for an identified set of entries (identified by a given index value) in the data array spanning the w data ways which have the same partial tag value, only one stored data value has an inhibit bit of "0" stored in association therewith and the others must all be "1". This then means that at most one data way can determine a match condition against the received partial tag bits and read out its identified data value. Accordingly, this cache saves energy expenditure by comparison to a prior art parallel lookup partial tag matching configuration.

Returning to the tag array side of the cache, note that in addition to storing tag portions, each tag array way also stores an inhibit bit copy 110 associated with each stored tag portion. This inhibit bit copy 110 is identical to the inhibit bits 108 stored in the data array. The administration of the inhibit bits 108 and their copies 110 to ensure that the required exclusivity function is provided and to ensure that the inhibit bit copies 110 faithfully correspond to the inhibit bit 108 will be described in more detail below. For the time being, note that the inhibit bit copy 110 is also read out as part of the tag lookup procedure such that when the set of tag array entries identified by the index value is accessed, it is already known (on the tag array side of the cache) what the corresponding inhibit bit values that will be encountered on the data array side are. Accordingly, when the tag array determines that a "hit" has occurred it therefore instructs the data way control 112 to steer the data output multiplexer 114 to output the data value which is readout from the corresponding data way. The inclusion of the data bit copy 110 on the tag array side means that the data way control 112 can, at the same time as being provided with the hit information from the tag array, also be provided with information regarding the relevant inhibit bit status as well as partial hit information (i.e. where partial tags match).

Taking first the example in which the tag array indicates a hit and the inhibit bit copy stored in association with the relevant tag portion in the tag array indicates a value of "0", then the data way control 112 knows that a match will have been found in one of the CAMs as well as specifically which way this occurred in, and further that the associated inhibit bit stored in that CAM will allow the match condition to be found and the corresponding data value to be read out. Accordingly, in this situation the data way control 112 directly steers the data multiplexer 114 to output the read out data value from the corresponding way.

Considering then another possibility, it may be the case that the tag array indicates a hit, but the corresponding inhibit bit is set to "1" meaning that a match condition in the relevant CAM 104 will not be found. In this situation, the data way controller 112 can make use of its inhibit bit control unit 116 and cause a new data access procedure in the data array to be carried out, using the same partial tag bits and index value, but providing an inhibit bit value of "1" to the way in which it is known (on the basis of the tag array hit information) that the desired data value is stored. Also, because an inhibit bit value was read out for each of the w ways as part of the tag lookup procedure, it is further known if any of the other ways has an inhibit bit of "0" stored in association therewith and the inhibit bit control 116, as part of the new data access procedure, can require that an inhibit bit value of "1" is held in that other way, to ensure that the match does not occur there. Generally, the cache implements a most recently used (MRU) policy and accordingly after the reissued data access procedure has been carried out to receive the desired, data value, the inhibit bits in this set identified by the index value and having a matching partial tag value can be updated such that the desired data value now has an inhibit bit of "0" stored in association therewith and other data values in this set have an inhibit bit of "1" stored in association therewith.

Finally, the inhibit, hit and partial hit information which the tag array can derive from a lookup procedure can also be made use of in the context of a write operation when a new data value is to be stored in the cache. As part of this process, the address associated with the new data value to be stored provides an index value which indicates the set of entries in the tag array and the data array. The partial tag bits of the tag portion of the new address can be used to determine whether other entries in the identified set of entries for this address will generate a partial hit (i.e. a matching of the partial tag bits) and this information can be used by the data way control 112 (in particular by its data way write control 118) when performing an update operation to select only those data ways in which an update needs to be made. For example, it may be the case that only the data way in which the new data value is being written needs to be written to, but it may be the case that where it has been identified that a partial tag hit will occur in another data way that the write operation should also extend to this data way in order to update the inhibit bit there, i.e. to set this to "1", leaving only the newly written data value (as the MRU value) with an inhibit value of "0".

Figure 3:
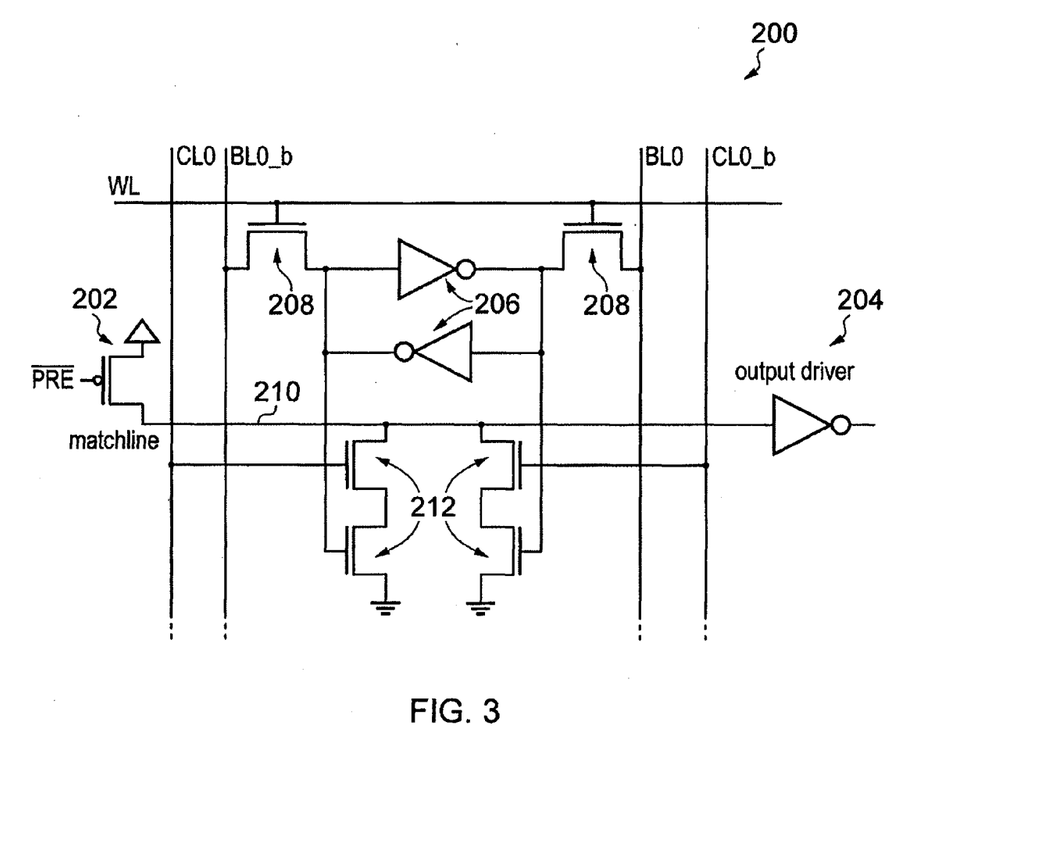
FIG. 3 schematically illustrates the configuration of a single bit store in a partial tag store of a data array in one embodiment.

FIG. 3 schematically illustrates a circuit level implementation of a single bit storage within the CAM 104 shown in FIG. 2. For example in the implementation described with reference to FIG. 2 in which the seven bits of the tag portion are taken as the partial tag bits, a given entry of the CAM 104 would comprise eight of the components illustrated in FIG. 3 (with the exception of the matchline recharge switch 202 and the output driver 204 which are only provided once for each entry in the CAM 104). The bit cell 200 essentially comprises a standard 6T SRAM cell formed by the cross coupled inverters 206 and the access switches 208. The cell can be written in the usual fashion by driving its bit lines BL0 and BL0_b whilst asserting WL. In order to perform a read operation on this cell the matchline 210 is precharged during a standard recovery time allotted for precharging the SRAM data sub-array bit lines for a read. This is done by asserting a PRE pulse signal which can de derived from the original SRAM peripheral logic. The relevant bit of the incoming partial tag (or the required inhibit bit state) is driven on the compare lines CL0 and CL0_b. The four NMOS transistors 212 in each cell discharge the match line if the stored bit (held by the cross coupled inverters 206) differs from the compare lines. The output of the output driver 204 is incorporated into a conventional word line driver for the corresponding data way to integrate the CAM output, such that the SRAM word line is only asserted if a match was found between the values stored in the bit cells and that being compared against.

Figure 4:
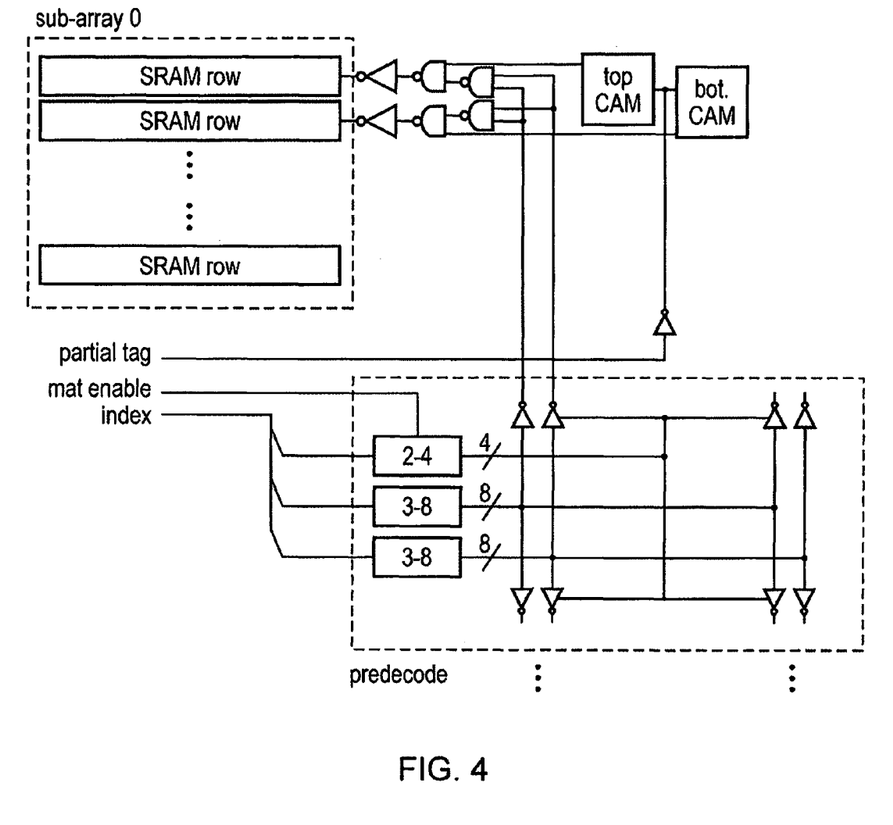
FIG. 4 schematically illustrates the combining of word line decode signals with information from content-addressable memories to implement the present techniques in one embodiment.

FIG. 4 schematically illustrates how predecode information for the selection of a given word line is combined with the result of the comparison taking place in the CAM. In the example embodiment illustrated in FIG. 4 the tag and data arrays are subdivided into mats, which are two-by-two squares of sub arrays that share a common predecoder. The mats are interconnected via intra-bank H-trees, which in turn connect to the bank-level interconnect. FIG. 4 schematically illustrates the internal layout for a single mat, in one implementation. As in a conventional sequential access the tag arrays indicate which data way to access, and one of the four sub arrays within the single mat corresponding to that way returns the data. The index bits along with an enable signal arrive at the predecoder, which comprises one gated 2-4 decoder (sub-array select and enable), two 3-8 decoders (upper and lower index bits), and a driver to submit the predecoded index to the sub-arrays. A final NAND stage combines the predecode signals and drives the selected word line. Additionally, each sub array within the mat is augmented with a 64 entry CAM, storing seven tag bits and an inhibit bit corresponding to each entry. The CAMs are located between the data sub arrays. The CAMs receive the partial tag bits and generate an output which is incorporated with the predecoded signals to provide the word line activation for each SRAM row.

In the illustrated embodiment, because the CAM design requires two horizontal routing tracks, two CAM arrays (labelled top CAM and bottom CAM) are placed side by side, spanning two SRAM rows.

Figure 5:
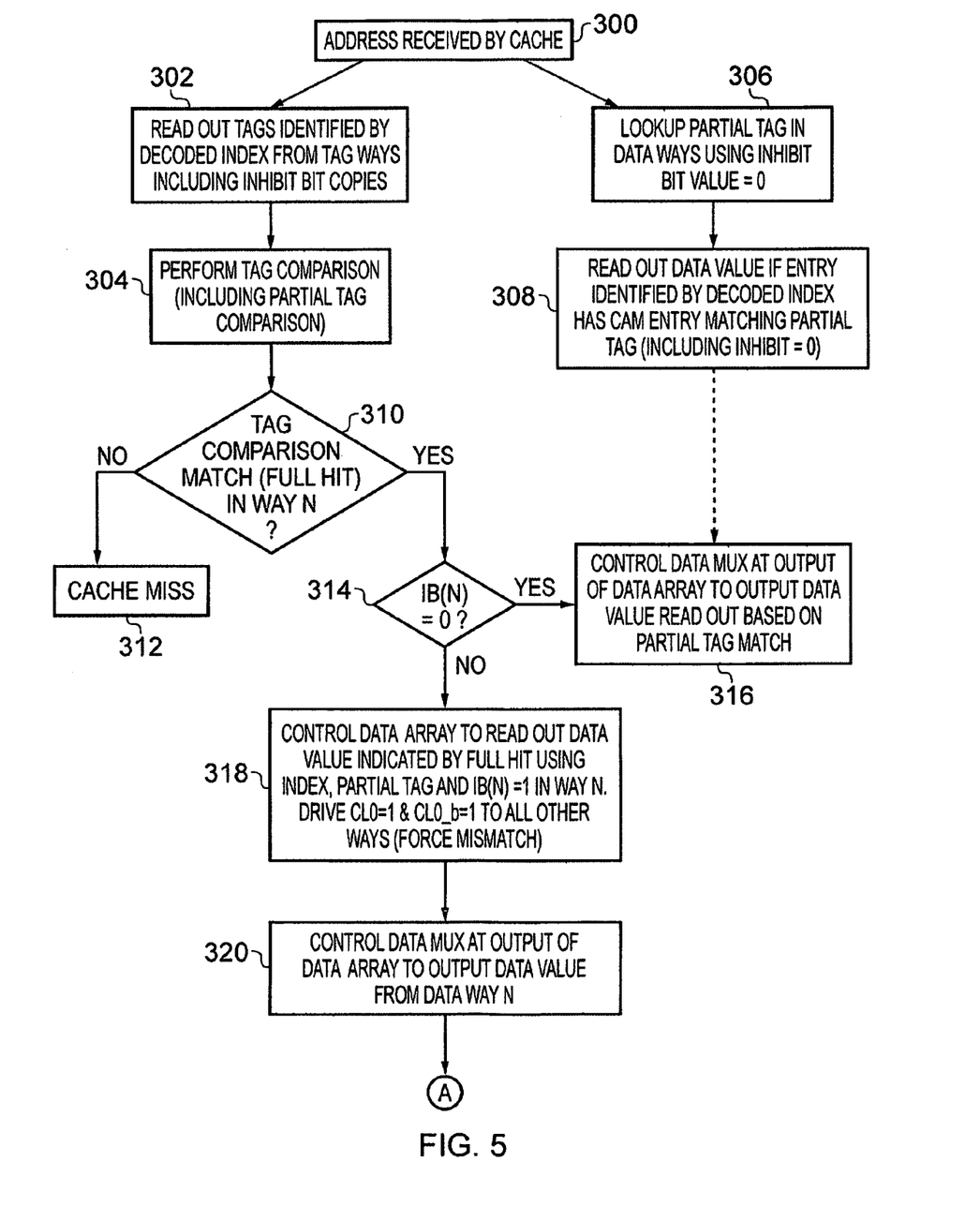
FIG. 5 schematically illustrates a series of steps taken in one embodiment to identify a data value on the basis of its address and to read it out.

FIG. 5 schematically illustrates a series of steps taken in one embodiment when a read access to the cache is made. The flow begins at step 300 when an address is received by the cache. Then, a tag lookup procedure and a data access procedure are carried out in parallel. The tag lookup procedure begins at step 302 where those tag portions identified by the decoded index value are read out from the respective tag ways. In addition to the tag portions themselves the inhibit bit copies stored in association with each tag portion are also read out. Then at step 304 a tag comparison is performed (from which a partial tag comparison on only the seven lower stored bits of the tag portion is also performed). Then at step 310 it is determined if the tag comparison has resulted in a match in a given way of the tag array. If it has not then the required data value (identified by the address received at step 300) is not stored in the cache and a cache miss (step 312) results.

The data access procedure carried out in parallel begins at step 306 at which the partial tag bits of the tag portion of the received address are used to access the content-addressable memories of the data ways. As part of this an inhibit bit value of 0 is also required to be found, i.e. an inhibit bit value of 0 effectively forms an additional bit of the partial tag value passed to the CAMs. Then at step 308, if there is a match of the partial tag value (including an additional inhibit bit of 0) in a data way of the data array, the corresponding data value is read out.

The tag lookup procedure and the data access procedure come together at steps 314 and 316. At step 314, after it has been determined at step 310 that a hit has occurred in way N then at step 314 it is determined if the inhibit bit (in fact the copy of the inhibit bit) read out from the tag array N has a value of 0. If it does then the flow proceeds to step 316 where the data multiplexer at the output of the data array is controlled to output the data value which was read out on the partial tag match. If however the copy of the inhibit bit read out from tag way N has a value of 1, then the flow proceeds from step 314 to step 318. This is the case when the desired data value is indeed stored in the cache in one of the data ways, but the associated inhibit bit was set to 1, preventing this data value from being read out. Hence, at step 318 a data access procedure is reinitiated to read out the data value corresponding to the tag portion which resulted in the full hit. This is performed using the same index value, the same partial tag value, but requiring an inhibit bit value of 1 in way N. At the same time the compare lines CL0 and CL0_B are driven with values of 1 to all other data ways in order to force a mismatch and prevent the data from those ways being read out. Finally, at step 320, the data multiplexer at the output of the data array is controlled to output the data, value read out by this reinitiated data access procedure from data way N.

Figure 6:
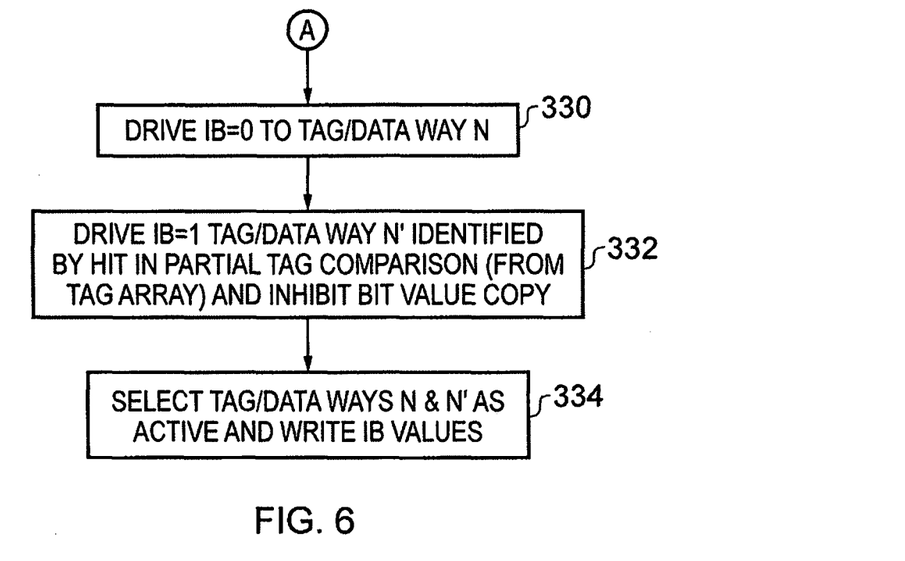
FIG. 6 schematically illustrates a series of steps taken in one embodiment to update the additional bits in the data array after a data value has been read out.

The series of steps schematically illustrated in FIG. 5 can be considered to continue by the series of steps schematically illustrated in FIG. 6, which show how the inhibit bit values are updated when the "NO" path out of step 314 in FIG. 5 is taken, i.e. when a tag hit occurred but the relevant inhibit bit prevented the data value from being initially read out. Hence, in this situation the flow begins at step 330 where an inhibit bit of 0 is driven to both tag and data way N. Then at step 332, an inhibit bit value of 1 is driven to both tag and data way N', this way being identified by the partial tag comparison performed as part of the tag lookup procedure (see FIG. 2) and the associated inhibit bit copy values read out. In other words, the w inhibit bit copy values read out in the tag lookup procedure will (by definition) only comprise one "0", this identifying the way N' referred to in step 332. Then at step 334 tag and data ways N and N' are selected as active (for example the data ways may be enabled by means of the decode enable signal issued by data way write control 118 in FIG. 2) and the inhibit bit values driven to these ways in step 330 and 332 are written.

Figure 7:
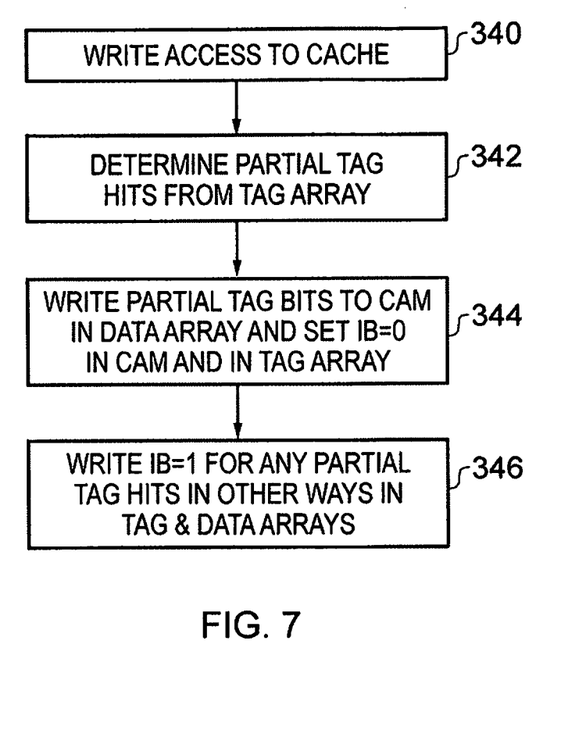
FIG. 7 schematically illustrates a series of steps taken in one embodiment when a write access to the cache is made.

Finally, FIG. 7 schematically illustrates a series of steps when a data value is written to the cache. The write access to the cache begins at step 340, whereafter at step 342 the partial tag bits of the tag portion of the address associated with the data value to be written are examined to determine partial tag hits from the tag array. Then at step 344, the partial tag bits are written to the selected entry in the CAM of the way selected for writing and an associated inhibit bit 0 is set both in the CAM in the data array and in the inhibit bit copy stored in the tag array. Finally at step 346, an inhibit bit value of 1 is written to any other ways in which it is determined at step 342 that a partial tag hit would occur, this being performed in both the inhibit bit storage in the data arrays and the inhibit bit copy storage in the tag arrays. Accordingly, a most recently used (MRU) policy is implemented wherein a new data value written to the cache has the relevant inhibit bits set such that this new data value will be immediately accessed if the next access request selecting the corresponding set relates to that data value (FIG. 7). Also the inhibit bit values are updated if a data access request is received which cannot immediately access a data value (because the inhibit bit values prevented this from happening) such that the next time such a data access request is received, it will proceed first time (see FIG. 6).

In overall summary, a data processing apparatus has a cache comprising a data array and a tag array. The tag array stores address tag portions associated with the data values in the data array. The cache performs a tag lookup, comparing a tag portion of a received address with a set of tag entries in the tag array. The data array comprises a partial tag store storing a partial tag value in association with each data entry. In parallel with the tag lookup, a partial tag value of the received address is compared with partial tag values stored in association with a set of data entries in said data array. A data value is read out if a match condition occurs, wherein the received partial tag value matches a partial tag value stored in association with that data value. Exclusivity circuitry ensures that at most one partial tag value of said partial tag values stored in association with said set of data entries can generate said match condition.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:
1. A data processing apparatus comprising:
a processor core configured to perform data processing operations;
a cache having a data array and a corresponding tag array, said data array configured to store data values for access by said processor core and said tag array configured to store tag portions of addresses associated with said data values in tag entries of said tag array,
said cache configured to perform a tag lookup procedure in response to a received address, said tag lookup procedure comprising comparing a tag portion of said received address with an identified set of tag entries in said tag array to determine if a data value associated with said received address is stored in said cache, said identified set of tag entries being determined by an index portion of said received address,
wherein said data array comprises a partial tag store configured to store a partial tag value in association with each entry in said data array, said partial tag value comprising a strict subset of the tag portion stored in a corresponding entry of the tag array,
wherein said data array is configured to perform a data access procedure in parallel with said tag lookup procedure, said data access procedure comprising comparing a partial tag value of said received address with partial tag values stored in association with a set of data entries in said data array corresponding to said identified set of tag entries in said tag array,
wherein said data array is configured to read out a selected data value from an entry in said set of data entries in said data array if a match condition occurs, said match condition comprising said partial tag value of said received address matching a partial tag value stored in association with that entry,
wherein said cache comprises exclusivity circuitry configured to ensure that at most one partial tag value of said partial tag values stored in association with said set of data entries can generate said match condition, wherein said exclusivity circuitry comprises an additional bit stored in association with each said partial tag value associated with each entry in said data array, wherein said data array is configured such that said match condition further requires said additional bit to have a predetermined value and said cache is configured to administer values of said additional bits such that at most one additional bit stored in association with each said partial tag value stored in association with said set of data entries can have said predetermined value.

2. The data processing apparatus as claimed in claim 1, wherein each said additional bit stored in association with each said partial tag value associated with each entry in said data array is also stored as a duplicate bit in said tag array in association with each said tag portion corresponding to each said entry in said data array.

3. The data processing apparatus as claimed in claim 2, wherein said cache is configured to control said data array to output said selected data value if said duplicate bit corresponding to said selected data value has said predetermined value.

4. The data processing apparatus as claimed in claim 1, wherein said cache is configured to control said data array to subsequently read out said data value from a different entry in said set of data entries in said data array by requiring that the additional bit stored in association with that different entry does not have said predetermined value if said tag lookup procedure indicates that said data value associated with said received address is stored in said different entry, and to cause said additional bit stored in association with said different entry to be updated to have said predetermined value and to cause said additional bit stored in association with said selected data value to be updated not to have said predetermined value.

5. The data processing apparatus as claimed in claim 1, wherein said cache is configured, if said tag lookup procedure indicates that said data value associated with said received address is stored in said selected entry but said additional bit stored in association with said selected entry did not have said predetermined value, to control said data array to subsequently read out said data value from said selected entry by requiring that said additional bit stored in association with that selected entry does not have said predetermined value and to update said additional bit to have said predetermined value.

6. The data processing apparatus as claimed in claim 1, wherein said cache is configured, when storing a new data value in newly selected entry in said data array for access by said processor core, to cause said additional bit stored in association with said newly selected entry to have said predetermined value.

7. The data processing apparatus as claimed in claim 6, wherein said cache is configured, when storing said new data value, to identify a new set of data entries in said data array determined by an index portion of a newly received address associated with said new data value, and to cause said additional bit stored in association with each of said new set of data entries other than said newly selected entry not to have said predetermined value.

8. The data processing apparatus as claimed in claim 1, wherein said cache is configured to cause said duplicate bit to be identically updated when an update to said additional bit is made.

9. The data processing apparatus as claimed in claim 1, wherein said cache is an n-way associative cache, and wherein said data array comprises n data ways and said tag array comprises n tag ways corresponding to said n data ways.

10. The data processing apparatus as claimed in claim 9, wherein said identified set of tag entries comprises a tag entry from each of said n tag ways and said set of data entries comprises a data entry from each of said n data ways.

11. The data processing apparatus as claimed in claim 9, wherein said n-way associative cache is a highly associative cache, wherein n>4.

12. The data processing apparatus as claimed in claim 11, wherein said partial tag value comprises p bits and wherein $2^P \geq 4n$.

13. The data processing apparatus as claimed in claim 1, wherein said exclusivity circuitry is configured to be controlled by said processor core to determine which one partial tag value of said partial tag values can generate said match condition.

14. The data processing apparatus as claimed in claim 1, wherein said partial tag store comprises a content addressable memory.

15. The data processing apparatus as claimed in claim 1, wherein said data processing apparatus comprises multiple processor cores which share access to said cache.

16. The data processing apparatus as claimed in claim 1, wherein said cache is not a first level cache with respect to said processor core.

17. The data processing apparatus as claimed in claim 1, wherein said data processing apparatus is embodied as a system-on-chip and said cache is a last-level cache on said system-on-chip.

18. A method of operating a data processing apparatus comprising the steps of:
performing data processing operations in a processor core;
storing data values for access by said processor core in a data array of a cache and storing tag portions of addresses associated with said data values in tag entries of a tag array of said cache;
performing a tag lookup procedure in said cache in response to a received address, said tag lookup procedure comprising comparing a tag portion of said received address with an identified set of tag entries in said tag array to determine if a data value associated with said received address is stored in said cache, said identified set of tag entries being determined by an index portion of said received address;
storing in a partial tag store a partial tag value in association with each entry in said data array, said partial tag value comprising a strict subset of the tag portion stored in a corresponding entry of the tag array;
performing a data access procedure in said data array in parallel with said tag lookup procedure, said data access procedure comprising comparing a partial tag value of said received address with partial tag values stored in association with a set of data entries in said data array corresponding to said identified set of tag entries in said tag array; and
reading out a selected data value from an entry in said set of data entries in said data array if a match condition occurs, said match condition comprising said partial tag value of said received address matching a partial tag value stored in association with that entry,
wherein said cache comprises exclusivity circuitry configured to ensure that at most one partial tag value of said partial tag values stored in association with said set of data entries can generate said match condition, wherein said exclusivity circuitry comprises an additional bit stored in association with each said partial tag value associated with each entry in said data array, wherein said match condition further requires said additional bit to have a predetermined value; and
said storing in said partial tag store step comprises administering values of said additional bits such that at most one additional bit stored in association with each said partial tag value stored in association with said set of data entries can have said predetermined value.

19. A data processing apparatus comprising:
processor means for performing data processing operations;
cache means having data array means and corresponding tag array means, said data array means for storing data values for access by said processor core and said tag array means for storing tag portions of addresses associated with said data values in tag entries of said tag array,
said cache means for performing a tag lookup procedure in response to a received address, said tag lookup procedure comprising comparing a tag portion of said received address with an identified set of tag entries in said tag array means to determine if a data value associated with said received address is stored in said cache means, said identified set of tag entries being determined by an index portion of said received address, wherein said data array means comprises partial tag storage means for storing a partial tag value in association with each entry in said data array means, said partial tag value comprising a strict subset of the tag portion stored in a corresponding entry of the tag array means, said data array means for performing a data access procedure in parallel with said tag lookup procedure, said data access procedure comprising comparing a partial tag value of said received address with partial tag values stored in association with a set of data entries in said data array means corresponding to said identified set of tag entries in said tag array means, said data array means for reading out a selected data value from an entry in said set of data entries in said data array means and if a match condition occurs, said match condition comprising said partial tag value of said received address matching a partial tag value stored in association with that entry, wherein said cache means comprises exclusivity means for ensuring that at most one partial tag value of said partial tag values stored in association with said set of data entries can generate said match condition, wherein said exclusivity means comprises an additional bit stored in association with each said partial tag value associated with each entry in said data array means, wherein said data array means is configured such that said match condition further requires said additional bit to have a predetermined value and said cache means is configured to administer values of said additional bits such that at most one additional bit stored in association with each said partial tag value stored in association with said set of data entries can have said predetermined value.

* * * * *